United States Patent
Besson et al.

(10) Patent No.: US 9,898,646 B2
(45) Date of Patent: Feb. 20, 2018

(54) METHOD OF VALIDATION INTENDED TO VALIDATE THAT AN ELEMENT IS COVERED BY A TRUE SKIN

(71) Applicant: MORPHO, Issy-les-Moulineaux (FR)

(72) Inventors: Adrien Besson, Issy-les-Moulineaux (FR); Alain Thiebot, Issy-les-Moulineaux (FR); Denis Dumont, Issy-les-Moulineaux (FR); Jérôme Lorenzi, Issy-les-Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 15/036,919

(22) PCT Filed: Dec. 17, 2014

(86) PCT No.: PCT/EP2014/078320
§ 371 (c)(1),
(2) Date: May 16, 2016

(87) PCT Pub. No.: WO2015/091701
PCT Pub. Date: Jun. 25, 2015

(65) Prior Publication Data
US 2016/0275335 A1  Sep. 22, 2016

(30) Foreign Application Priority Data

Dec. 19, 2013 (FR) .................................... 13 62977

(51) Int. Cl.
*G06K 9/00* (2006.01)
(52) U.S. Cl.
CPC ....... *G06K 9/0012* (2013.01); *G06K 9/00906* (2013.01)

(58) Field of Classification Search
CPC ............. G06K 9/00013; G06K 9/0012; G06K 9/00906; G06K 9/00046;
(Continued)

(56) References Cited

U.S. PATENT DOCUMENTS

| 6,367,695 B1 * | 4/2002 | Mair ....................... G07F 19/20 235/379 |
| 7,576,843 B2 * | 8/2009 | Rouget .............. G06K 9/00046 356/71 |

(Continued)

OTHER PUBLICATIONS

Maltoni; "Handbook of Fingerprint Recognition, 2nd ed;" Jan. 1, 2009; XP002737503; pp. 386-391.
(Continued)

*Primary Examiner* — Ali Bayat
(74) *Attorney, Agent, or Firm* — Oliff PLC; R. Brian Drozd

(57) ABSTRACT

Disclosed is a method intended to validate that an element is covered with a true skin and implemented by a validation device including a light source at at least one wavelength, a sensor, an analysis module and a decision-taking module. The method may include: placing a surface of the element in front of the light source and the sensor; illuminating, by the light source, the surface of the element; capturing, by the sensor, for each wavelength, an image of the positioned element that encompasses an illuminated zone of the element directly illuminated by the light beam and a peripheral zone ("the diffusion zone of the element," which is peripheral to the illuminated zone); analyzing the illuminated zone and the diffusion zone of the captured image; and deciding, by the decision-taking module, whether the element is covered with a true skin according to the results of the analysis.

9 Claims, 2 Drawing Sheets

(58) Field of Classification Search
CPC ... G06K 2009/00932; G06K 2209/401; H04N 5/33; A61B 5/1172
See application file for complete search history.

(56) References Cited

U.S. PATENT DOCUMENTS

| | | | |
|---|---|---|---|
| 2005/0031173 A1* | 2/2005 | Hwang | G06K 9/00597 382/118 |
| 2010/0067747 A1* | 3/2010 | Perruchot | G06K 9/0012 382/115 |
| 2010/0141380 A1* | 6/2010 | Pishva | G06K 9/0012 340/5.2 |
| 2011/0129128 A1* | 6/2011 | Makimoto | G06K 9/00013 382/124 |
| 2012/0218397 A1 | 8/2012 | Monden | |

OTHER PUBLICATIONS

Rowe et al; "Multispectral Fingerprint Image Acquisition;" Advances in Biometrics; Jan. 1, 2008; XP002737504; pp. 3-23.
Galbally et al; "Fingerpring Anti-spoofing in Biometric Systems;" Handbook of Biometric Anti-Spoofing; Jan. 1, 2014; XP002737505; pp. 35-64.
"Liveness Detection;" Encyclopedia Biometrics; Jan. 1, 2009; XP002737506; pp. 924-931.
Drahansky; "Liveness Detection in Biometrics;" Advanced Biometric Technologies; Jan. 1, 2011; XP002737507; pp. 179-198.
Mar. 27, 2015 Search Report issued in International Patent Application No. PCT/EP2014/078320.

\* cited by examiner

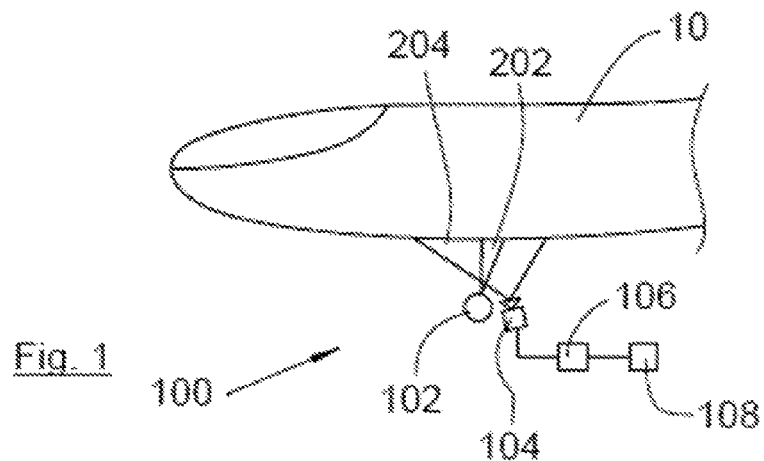
Fig. 1
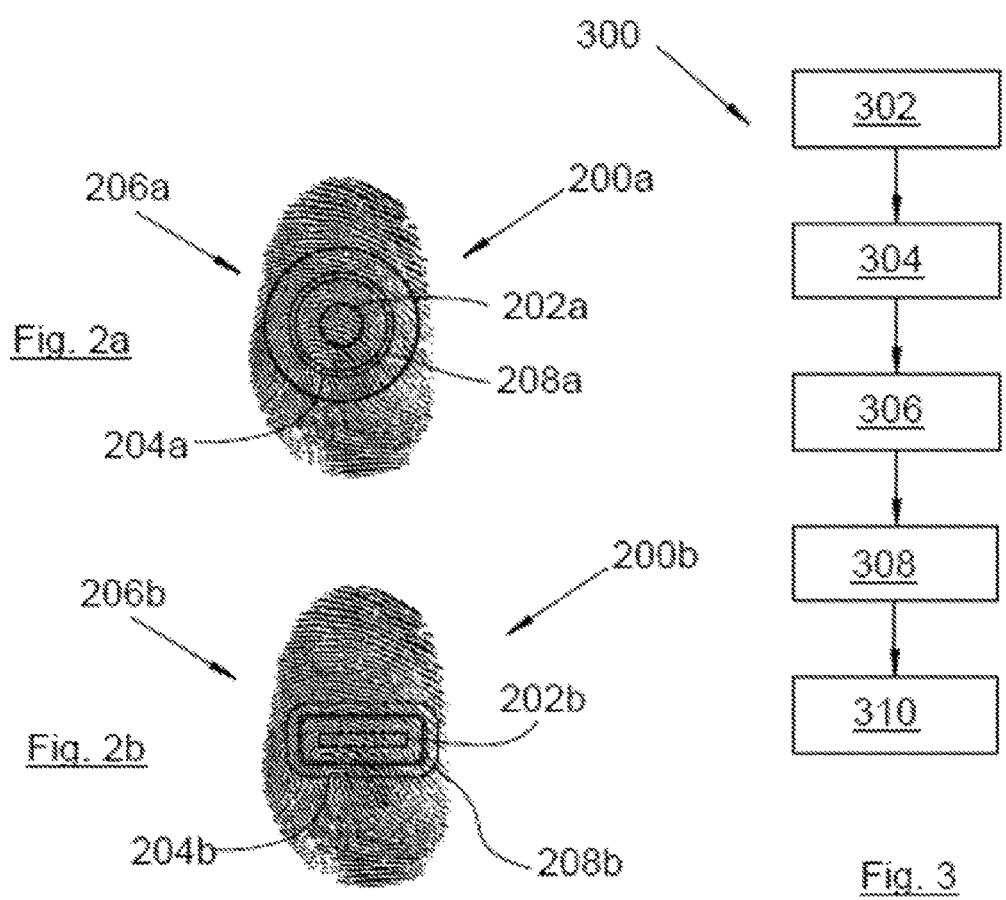
Fig. 2a
Fig. 2b
Fig. 3

METHOD OF VALIDATION INTENDED TO VALIDATE THAT AN ELEMENT IS COVERED BY A TRUE SKIN

The present invention relates to the field of the detection of fraud in the field of identification/authentication by biometry. The invention relates more particularly to a validation method intended to validate the fact that an element is covered with a true skin, in particular in the context of biometric analysis, as well as a validation device implementing such a method.

A device for identifying an individual by his finger/palm print consists of a sensor, a comparison means and a decision-taking means.

The sensor has a lighting device and an acquisition device for the capture of images of one or more finger or palm prints. A template is next extracted from each finger or palm print revealing its discriminating features. The comparison means compares the captured image or the biometric templates that issue from the image with the biometric images or templates in a database that contains the images or templates of persons previously recorded in the identification device. The decision-taking means is intended to take a decision as to the identification of the individual from the result of the comparisons.

Some ill-intentioned individuals attempt to be identified fraudulently by using decoys in order to lead the identification device into error.

Various validation methods are known for validating the fact that the skin present in front of the sensor is true and therefore that the finger bearing the fingerprint is a true finger.

Some known methods are based entirely on the analysis of images, in particular by identifying artefacts making frauds. These methods are however not robust against careful frauds.

Other methods are also known for capturing a series of images of the finger and for measuring for example sweating, pulse, oximetry or whitening of the finger during pressing on the capture surface.

Such methods require in particular a non-compressible acquisition time since it is related to the rate of change of the phenomenon being observed, which degrades the ergonomics of the sensor.

The document US-A-2012/218397 describes a device that is provided for detecting whether a finger is true or false. The finger comprises a light source that illuminates the finger and an image sensor that captures an image of the finger. The light flow that illuminates the finger penetrates the finger and is diffused therein. The light flow thus diffused is extracted from the finger at the level of a diffusion zone that is away from the area of the finger that is illuminated by the light source. To check whether the finger is true or false, the image sensor is disposed so as to capture an image only of the diffusion zone. The characteristics of this image are then analysed in order to check whether the finger is true or false.

Such a device is therefore based only on an image of the diffusion zone and, in some cases of fraud, this may not be sufficient.

One object of the present invention is to propose a validation method intended to validate the fact that an element is covered with a true skin and which does not have the drawbacks of the prior art.

For this purpose, a validation method is proposed, intended to validate the fact that an element is covered with a true skin and implemented by a validation device comprising a light source at at least one wavelength, a sensor, an analysis module and a decision-taking module, said validation method comprising:
 a positioning step during which a surface of said element is placed in front of the light source and the sensor,
 an illumination step during which the light source illuminates said element,
 a capture step for capturing, by means of said sensor, for the or each wavelength, an image of said element thus positioned that encompasses an illuminated zone of said element directly illuminated by the light beam emitted by the light source and a peripheral zone, referred to as the diffusion zone of said element, which is peripheral to said illuminated zone,
 an analysis step during which the or each image thus captured is analysed, and
 a decision-taking step during which the decision-taking module takes a decision as to whether said element is covered with a true skin according to the results of the analysis step.

Advantageously, the analysis consists, for the or each image, in dividing an analysis zone covering the illuminated zone and diffusion zone into a plurality of calculation zones, establishing an average intensity for each calculation zone, an intensity curve and an intensity gradient curve according to the distance from the calculation zone to the boundary of the illuminated zone and comparing characteristics of these curves with those extracted from reference curves.

Advantageously, the light source emits in at least two distinct wavelengths, and the analysis step further consists of establishing, for each calculation zone of said analysis zone, the curve of the intensity ratio for two distinct wavelengths according to the distance from said calculation zone to the boundary of the illuminated zone, and the curve of the ratio of the intensity gradient for two distinct wavelengths according to the distance from said calculation zone to the boundary of the illuminated zone and comparing characteristics of these curves with those extracted from reference curves.

According to a particular embodiment, the light source is rectangular, and the division of the analysis zone consists, for the or each image, in dividing said image into a plurality of rectangular bands, the edges of which are equidistant from the edges of the illuminated zone.

According to a particular embodiment, the light source is circular, and the division of the analysis zone consists, for the or each image, of dividing said image into a plurality of concentric rings centred on the centre of the illuminated zone.

Advantageously, the light source emits in a wavelength of between 350 and 550 nm and a wavelength higher than 600 nm.

The invention also proposes a validation device intended to validate the fact that an element is covered with a true skin, said validation device comprising:
 a light source emitting at least one wavelength, and intended to illuminate said element,
 a sensor configured to capture, for the or each wavelength, an image of said element positioned in front of the light source and the sensor that encompasses an illuminated zone of said element directly illuminated by the light beam emitted by the light source and a peripheral zone, referred to as the diffusion zone, of said element that is peripheral to said illuminated zone,
 an analysis module intended to receive the or each image captured by the sensor and to analyse it, and a decision-taking module intended to take a decision as to whether said element is covered with a true skin, from the information transmitted by the analysis module.

Advantageously, the analysis module comprises, for the or each image, means for dividing an analysis zone covering the illuminated zone and the diffusion zone into a plurality of calculation zones, means for establishing, for each calculation zone, the average intensity of said calculation zone, in order to establish the intensity curve and the curve of the intensity gradient according to the distance from the calculation zone to the boundary of the illuminated zone and means for comparing characteristics of these curves with those extracted from reference curves.

Advantageously, the light source emits in at least two distinct wavelengths, and the analysis module further comprises means for establishing, for each calculation zone of the analysis zone, the curve of the intensity ratio for two distinct wavelengths according to the distance from said calculation zone to the boundary of the illuminated zone, and the curve of the ratio of the intensity gradient for two distinct wavelengths according to the distance from said calculation zone to the boundary of the illuminated zone, and means for comparing characteristics of these curves with those extracted from reference curves.

According to a particular embodiment, the light source is rectangular, and the analysis module comprises, for the or each image, means for dividing said image into a plurality of rectangular bands, the edges of which are equidistant from the edges of the illuminated zone.

According to a particular embodiment, the light source is circular, and the analysis module comprises, for the or each image, means for dividing said image into a plurality of concentric rings centred on the centre of the illuminated zone.

The features of the invention mentioned above, as well as others, will emerge more clearly from a reading of the following description of an example embodiment, said description being given in relation to the accompanying drawings, among which:

FIG. 1 is a schematic representation of a validation device according to the invention, FIG. 2a is an image of a fingerprint seen by the validation device according to one embodiment of the invention, FIG. 2b is an image of a fingerprint seen by the validation device according to another embodiment of the invention, FIG. 3 is an algorithm of a validation method according to the invention, FIG. 4 shows the reflectance of a true finger as a function of the wavelength of the light flow that illuminates it, FIG. 5 shows an example of an intensity curve, and FIG. 6 shows a curve representing the penetration in cm of the light in the skin as a function of the wavelength.

The principle of the invention consists of validating the fact that an element, in particular the bottom surface of one or more fingers or of the palm, is covered with a true skin and is therefore part of a human body. The principle of the invention can also apply to other parts of the human body such as the face. The principle of the invention consists more precisely of illuminating the surface of the element by means of a light source making it possible to illuminate only a well defined zone of the element and keeping a zone without direct illumination, capturing an image of these two zones, namely the zone directly illuminated and the zone not directly illuminated, and analysing this image in order to deduce therefrom whether said element is covered with a true skin or a false skin.

The illumination can be achieved via a capture of images without contact or with contact through a contact surface, in particular a prism or an optical plate.

In the remainder of the description, the element is a finger, but the invention applies to all other parts of the body, such as a plurality of fingers, a palm or a face.

In particular, one advantageous embodiment allows a sharp transition between the directly illuminated zone and the zone without direct illumination. One example embodiment may be one or more point light sources with low spread or one or more lines.

FIG. 1 shows a validation device 100 that is intended to validate the fact that an element 10, here a finger, is covered with a true skin and is therefore a true finger 10.

The validation device 100 comprises:
- a light source 102 with at least one wavelength intended to illuminate a surface of the finger 10, and
- a sensor 104 intended to capture, for the or each wavelength, an image 200a-b which, as described below, comprises both the surface illuminated directly by the light source 102 and the non-illuminated surface immediately adjacent to the illuminated surface, that is to say an image 200a-b having a reflection zone 202a-b where the light beam emitted by the light source 102 is directly reflected by said element 10 and a diffusion zone 204a-b where part of the light beam is diffused through said element 10.

In the remainder of the description, the reflection zone 202a-b is referred to as the illuminated zone 202a-b and is limited to the zone of the element 10 that is directly illuminated by the light beam, and the diffusion zone 204a-b is the zone of the element 10 that is not illuminated directly by the light beam but receives and emits light by diffusion of the light beam in the element 10.

The validation device 100 also comprises:
- an analysis module 106 intended to receive the or each image 200a-b captured by the sensor 104 and to analyse it as described below, and
- a decision-taking module 108 intended to take a decision as to whether the finger 10 is covered with a true skin, from the information transmitted by the analysis module 106.

FIG. 2a shows an image 200a captured by the sensor 104 in the case of a circular light source 102.

FIG. 2b shows an image 200b captured by the sensor 104 in the case of a rectangular light source 102.

The light source 102 has an angular opening reduced in at least one direction, so that the illumination of the surface is not uniform over the entire image 200a-b and is limited to a restricted zone constituting the illuminated zone 202a-b.

Thus the surface of the finger 10 is illuminated at the illuminated zone 202a-b where the light beam emitted by the light source 102 directly illuminates the surface (the backscattered light, comprising a diffuse reflection component, is therefore imaged) and the surface of the finger 10 is illuminated at a peripheral zone referred to as the diffusion zone 204a-b (not illuminated directly by the light source 102) because part of the light beam is transmitted into the finger 10, and is then diffused at the diffusion zone 204a-b that extends over the periphery of the illuminated zone 202a-b.

The image 200a-b that is captured by the sensor 104 shows the illuminated zone 202a-b and the associated diffusion zone 204a-b, and simultaneous analysis of these zones 202a-b and 204a-b makes it possible to conclude whether the finger 10 is true or false.

The illumination of the surface is said to be non-uniform over the entire image 200a-b when the illuminated zone 202*a-b* and the diffusion zone 204*a-b* are visible simultaneously to the sensor 104 but the diffusion zone 204*a-b* does not experience direct illumination from the light source 102, unlike the illuminated zone 202*a-b*.

The analysis therefore takes account both of the reflection on the finger 10 and of the diffusion by the finger 10 rather than only one of these two phenomena.

Thus, even if a decoy is used instead of a true finger, it will be difficult to produce a decoy having the optical characteristics particular to a true finger for reflection and diffusion.

In the particular case of capture with contact and to facilitate the positioning and holding of the finger 10 during capture of the image 200*a-b*, the validation device 200 may comprise a capture surface on which the finger 10 is placed in abutment and which guides the light between the light source 102, the finger 10 and the sensor 104.

In some embodiments with contact, a translucent plate is interposed between the finger 10 and the sensor 104 and the light source 102.

FIG. 3 is an algorithm of a validation method 300 intended to validate whether the finger 10 is covered with a true skin and used by the validation device 100.

The validation method 300 comprises:
- a positioning step 302 during which a surface of the finger 10 is placed in front of the validation device 100, and more particularly in front of the light source 102 and the sensor 104,
- an illumination step 304 during which the light source 102 illuminates the finger 10 so that the surface of the finger 10 presents the illuminated zone 202*a-b* and the diffusion zone,
- a capture step 306 during which the sensor 104 captures, for the or each wavelength, an image 200*a-b* of the illuminated zone 202*a-b* and of the diffusion zone 204*a-b*,
- an analysis step 308 during which the illuminated zone 202*a-b* and the diffusion zone 204*a-b* of the or each image 200*a-b* thus captured are analysed, and
- a decision-taking step 310 during which the decision-taking module 108 takes a decision as to whether the finger 10 is covered with a true skin according to the results of the analysis step 308.

The analysis step 308 consists, for example, for the or each image 200*a-b*, of dividing an analysis zone 206*a-b* covering both the illuminated zone 202*a-b* and the diffusion zone 204*a-b* into a plurality of calculation zones 208*a-b*, establishing an average intensity for each calculation zone 208*a-b*, an intensity curve and a curve of the intensity gradient according to the distance from said calculation zone 208*a-b* to an origin and comparing characteristics of these curves with those extracted from reference curves.

Simultaneous analysis of the illuminated zone 202*a-b* and the diffusion zone 204*a-b* makes it possible to have information on the reflection and on the diffusion of the finger 10 and therefore to have complementary information which, in a single capture and a single analysis, makes it possible to determine the veracity of the finger 10. Such a method therefore allows time saving and better robustness against attempts at fraud.

The origin of the analysis zone 206*a-b* depends on the shape thereof and is determined by means of the use of shape-analysis methods known to persons skilled in the art, such as skeletisation and artefact-removal methods. These methods make it possible to ensure that each point of the origin is equidistant from the closest point of the illuminated zone 202*a-b*.

The distance used is for example and conventionally the minimum distance between the contour of the calculation zone 208*a-b* and the contour of the illuminated zone 202*a-b*.

In the particular case of circular illumination (FIG. 2*a*), the illuminated zone 202*a* and the diffusion zone 204*a* are concentric circles, and the origin is fixed on the boundary of the illuminated zone 202*a*. The analysis zone 206*a* is divided into calculation zones 208*a* that are here rings 208*a* concentric with the illuminated zone 202*a*.

In the particular case of rectangular illumination (FIG. 2*b*), the illuminated zone 202*b* is a rectangle and the diffusion zone 204*b* is a larger rectangle, the edges of which are equidistant from the edges of the illuminated zone 202*b*, and the origin is fixed on the boundary of the illuminated zone 202*b*. The analysis zone 206*b* is divided into calculation zones 208*b* that are here rectangular bands 208*b*, the edges of which are equidistant from the edges of the illuminated zone 202*b* and the corners of which are rounded in an exaggerated manner in order to show the consistency of the distance between the contour of the calculation zone 208*b* and the contour of the illuminated zone 202*b*.

The boundary of the illuminated zone 202*a-b* that serves as an origin is determined for example by a calibration process based on the acquisition of a non-diffusing white target pattern through the sensor under non-uniform illumination as defined previously. The image obtained by capture of this material reflects only the direct reflection effect and not the diffusion effect through the nature of the material. Any illumination defects that may be observed (for example non-uniformity in the direct reflection zone, that is to say the illuminated zone 202*a-b*) will be compensated during calculation of the intensity profiles in order to obtain an intensity plateau in the direct reflection zone. The boundary of the direct reflection zone is defined at each point on the contour of the source, that is to say at each boundary point of the intensity plateau measured on the non-diffusing material.

The analysis module 106 then comprises, for the or each image 200*a-b*, means for dividing the analysis zone 206*a-b* into a plurality of calculation zones 208*a-b*, means for establishing, for each calculation zone 208*a-b*, the average intensity of said calculation zone 208*a-b*, and then for establishing the intensity curve according to the distance from the calculation zone 208*a-b* to the origin and the curve of the intensity gradient according to the distance from the calculation zone 208*a-b* to the origin, and means for comparing characteristics of these curves with those extracted from reference curves.

The characteristics to be compared are extracted from each image 200*a-b* advantageously previously processed with a view to not taking into account the background pixels. One example of such a processing is the application of a simple frequency filter or the use of a mask for locating the peak pixels generated by a template extractor.

The characteristics to be compared are thus in particular the absolute value of the intensity of each calculation zone 208*a-b* and the intensity gradient at each calculation zone 208*a-b*.

FIG. 5 shows an example of an intensity curve 502 in function of the distance with respect to the boundary of the illuminated zone 202*a-b* corresponding to the origin defined by the method described above.

For the finger 10 to be validated, it is necessary that the intensity curve and the gradient curve in function of the distance each remain between two reference bounds extracted from reference curves.

It is also possible to measure at each point the gap of how much the intensity value and the value of the gradient of said point depart with respect to the corresponding two reference bounds and to sum these differences in absolute value and to compare this sum with an acceptable limit threshold.

The reference curves are here the intensity curve and the intensity gradient curve that were established with a large panel of true fingers 10 and for the wavelength considered.

In the case of a circular light source 102, the division of the analysis zone 206a consists, for the or each image 200a, in dividing said image 200a into a plurality of concentric rings 208a centred on the centre of the illuminated zone 202a, at least one ring 208a of which is situated in the illuminated zone 202a and at least one ring 208a of which is situated in the diffusion zone 204a, calculating the average intensity on each ring 208a of the previously processed images, establishing a curve of the average intensity thus calculated as a function of the distance from the ring 208a to the boundary of the illuminated zone 202a-b, and a curve of the intensity gradient as a function of the distance from the ring 208a to the boundary of the illuminated zone 202a-b and comparing these curves with reference curves, for example by difference and verification with respect to a threshold.

The reference curves are here a curve of the average intensity in function of the distance from the ring 208a to the boundary of the illuminated zone 202a and a curve of the intensity gradient in function of the distance from the ring 208a to the boundary of the illuminated zone 202a-b that were established with true fingers 10 for the wavelength in question.

The analysis module 106 then further comprises, for the or each image 200a, means for dividing said image 200a into a plurality of concentric rings 208a centred on the centre of the illuminated zone 202a.

In the case of a rectangular light source 102, the principle is similar except that the calculation zones 208b are rectangular bands 208b rather than rings 208a. The division of the analysis zone 206b then consists, for the or each image 200b, in dividing said image 200b into a plurality of rectangular bands 208b. The analysis module 106 then further comprises, for the or each image 200b, means for dividing said image 200b into a plurality of rectangular bands 208b, the edges of which are equidistant from the edges of the illuminated zone 202b.

When the light source 102 emits in at least two distinct wavelengths, it is possible to combine the results obtained for each wavelength with the analysis results for each pair of distinct wavelengths.

The analysis step 308 then further consists of establishing, for each calculation zone 208a-b of said analysis zone 206a-b, the curve of the intensity ratio for two distinct wavelengths in function of the distance from said calculation zone 208a-b to the boundary of the illuminated zone 202a-b and the curve of the ratio of the intensity gradient for two distinct wavelengths in function of the distance from said calculation zone 208a-b to the boundary of the illuminated zone 202a-b and comparing characteristics of these curves with those extracted from reference curves.

Thus the method performs a relative analysis of the quantities in function of the wavelengths, calculating the ratio between the quantity (here the intensity gradient and the intensity) measured for one wavelength with the same quantity for another wavelength. Since true skin diffuses and absorbs in a typical manner according to the wavelengths and is difficult to imitate by means of an artificial element, this relative analysis facilitates verification of the veracity of the finger 10.

The reference curves are here the intensity ratio and intensity gradient ratio curves that were established with a large panel of true fingers 10 and for the two wavelengths considered.

The analysis module 106 then further comprises means for establishing, for each calculation zone 208a-b of the analysis zone 206a-b, the curve of the intensity ratio for two distinct wavelengths in function of the distance from said calculation zone 208a-b to the boundary of the illuminated zone 202a-b, and the curve of the ratio of the intensity gradient for two distinct wavelengths in function of the distance from said calculation zone 208a-b to the boundary of the illuminated zone 202a-b and means for comparing characteristics of these curves with those extracted from reference curves.

In the various embodiments presented, there are for example 5 to 50 rings and the difference in radii between two consecutive rings is around 0.1 to 0.3 mm depending on the wavelength used.

In the case of a light source 102 with a plurality of wavelengths, the sensor 204 preferably takes the form of a camera having a signal output for each red-green-blue wavelength. The camera is for example equipped with a Bayer filter, which makes it possible, in a single capture, to recover the image 200a-b corresponding to each wavelength on the appropriate signal output.

According to another particular embodiment, the light source 102 emits a white light.

In another embodiment with a plurality of wavelengths, it is possible to use a monochrome camera and to use a light source emitting the various wavelengths one after the other. One image for each wavelength is then obtained and this embodiment makes it possible in particular to use a wavelength in the near infrared.

It can also be envisaged, for each wavelength, for the zone of the illuminated finger 10 to be different. There may for example be a plurality of light sources 102, each illuminating according to a particular wavelength and illuminating a different zone of the finger 10.

Figure 4:
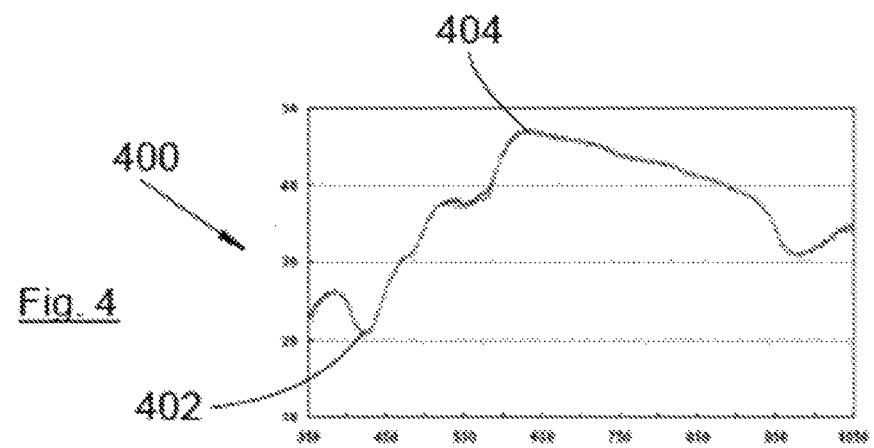
FIG. 4 shows the curve of the reflectance 400 in terms of percentage of a true finger 10 in function of the wavelength in nm of the light flow that illuminates it.
Figure 5:
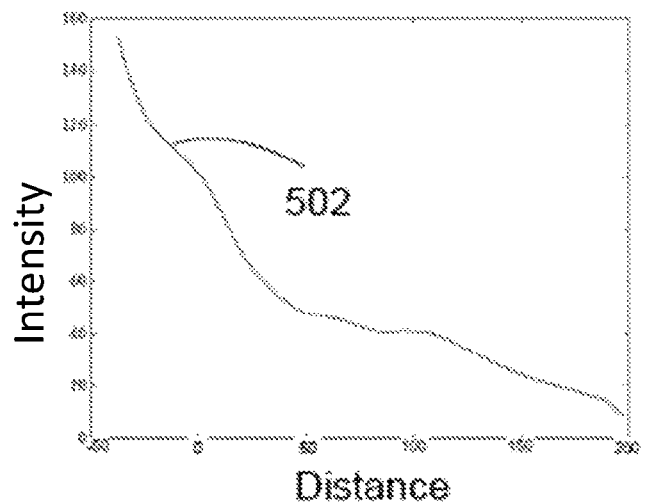
Figure 6:
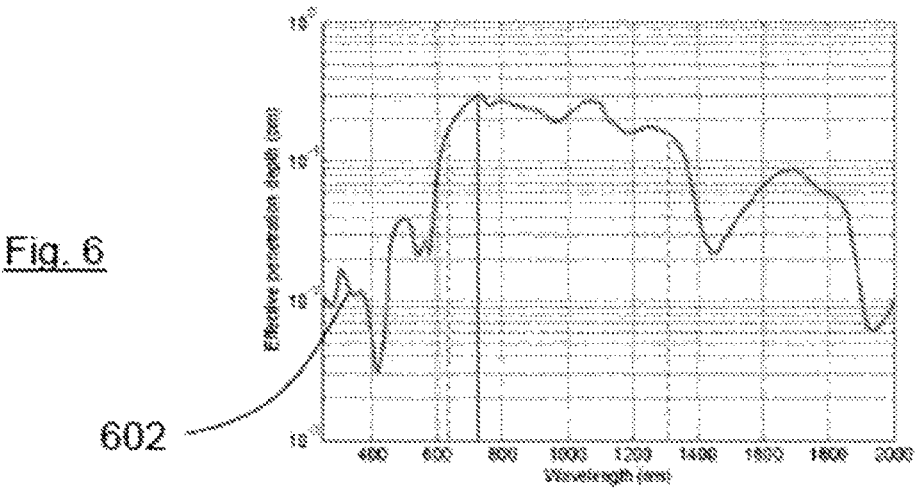
FIG. 6 shows the curve 602 of penetration in cm of the light in the skin in function of the wavelength. This curve is related to the reflectance curve 400 through the fact that the wavelengths not absorbed by the epidermis reaching the dermis, which is a less absorbent tissue, will be able to be diffused over a greater distance than the wavelengths remaining in the epidermis.

To maximise the difference in behaviour between reflection and diffusion, it is preferable to choose wavelengths having very different behaviours on a finger 10.

The reflectance 400 and penetration depth 602 curves show these very different behaviours. In the low wavelengths, that is to say for wavelengths ranging from 350 to 550 nm (UV, blue, green), the light remains in the superficial layers of the skin and is absorbed. For higher wavelengths, that is to say for wavelengths ranging from 600 to 900 nm and beyond (orange/red, near IR), the light penetrates the dermis and diffuses further therein.

Thus, in cases where two wavelengths will be used, the choice will be preferably for a wavelength of between 350 and 550 nm and a wavelength above 600 nm.

Naturally, the present invention is not limited to the examples and embodiments described and depicted but is capable of numerous variants accessible to a person skilled in the art.

For example, the invention has been particularly described in the case of a single light source 102, but it is possible to have a plurality of light sources 102 each pointing to a different surface of the element 10 to be validated.

There will then be the same number of illuminated zones 202a and diffusion zones 204a, which will undergo identical treatment and which will allow consolidation between a plurality of values and thus avoid complex frauds presenting parts of true skins and parts of false skins.

It is possible to have a plurality of illuminated zones that are separate, not connected and therefore discontinuous with each other, such as for example parallel bands, a matrix of dots . . . .

In this case, the distance separating two separate non-connected illuminated zones is greater than at least twice the minimum distance separating the illuminated zone from the analysis zone.

The invention claimed is:

1. A validation method implemented by a validation device comprising a light source emitting at one wavelength or at a plurality of wavelengths, a sensor, and circuitry adapted to implement an analysis module and a decision-taking module, said validation method comprising:
positioning a surface of said element so that it is placed in front of the light source and the sensor;
illuminating said element by the light source;
capturing, by said sensor, for each wavelength emitted by the light source, an image of said element thus positioned that encompasses an illuminated zone of said element directly illuminated by the light beam emitted by the light source and a peripheral zone, referred to as the diffusion zone of said element, which is peripheral to said illuminated zone;
performing an analysis each image thus captured; and
deciding as to whether said element is covered with a true skin according to the results of the analysis wherein the analysis comprises, for each captured image, dividing an analysis zone covering the illuminated zone and the diffusion zone into a plurality of calculation zones, establishing for each calculation zone an average intensity, an intensity curve and an intensity gradient curve according to the distance from the calculation zone to the boundary of the illuminated zone, and comparing characteristics of these curves with those extracted from reference curves.

2. The validation method according to claim 1, wherein the light source emits in at least two distinct wavelengths, and in that the analysis further comprises establishing, for each calculation zone of said analysis zone, the curve of the intensity ratio for two distinct wavelengths according to the distance from said calculation zone to the boundary of the illuminated zone, and the curve of the ratio of the intensity gradient for two distinct wavelengths according to the distance from said calculation zone to the boundary of the illuminated zone, and comparing characteristics of these curves with those extracted from reference curves.

3. The validation method according to claim 1, wherein the light source is rectangular, and in that the division of the analysis zone comprises, for each captured image, dividing said image into a plurality of rectangular bands, the edges of which are equidistant from the edges of the illuminated zone.

4. The validation method according to claim 1, wherein the light source is circular, and in that the division of the analysis zone comprises, for each captured image, dividing said image into a plurality of concentric rings centered on the center of the illuminated zone.

5. The validation method according to claim 1, wherein the light source emits in a wavelength of between 350 and 550 nm and a wavelength higher than 600 nm.

6. A validation device, said validation device comprising:
a light source emitting at least one wavelength, and configured to illuminate said element;
a sensor configured to capture, for each wavelength emitted by the light source, an image of said element positioned in front of the light source and the sensor that encompasses an illuminated zone of said element directly illuminated by the light beam emitted by the light source and a peripheral zone, referred to as the diffusion zone, of said element that is peripheral to said illuminated zone; and circuitry adapted to implement:
an analysis module configured to receive each image captured by the sensor and to analyze it; and
a decision-taking module executed by a processor and configured to take a decision as to whether said element is covered with a true skin, from the information transmitted by the analysis module, wherein the analysis module comprises circuitry adapted, for each image captured by the sensor, for dividing an analysis zone covering the illuminated zone and the diffusion zone into a plurality of calculation zones, for establishing, for each calculation zone, an average intensity of said calculation zone, in order to establish the intensity curve and the curve of the intensity gradient according to the distance from the calculation zone to the boundary of the illuminated zone, and for comparing characteristics of these curves with those extracted from reference curves.

7. The validation device according to claim 6, wherein the light source emits in at least two distinct wavelengths, in that the analysis module further comprises circuitry adapted for establishing, for each calculation zone of the analysis zone, the curve of the intensity ratio for two distinct wavelengths according to the distance from said calculation zone to the boundary of the illuminated zone, and the curve of the ratio of the intensity gradient for two distinct wavelengths according to the distance from said calculation zone to the boundary of the illuminated zone and circuitry adapted for comparing characteristics of these curves with those extracted from reference curves.

8. The validation device according to claim 6, wherein the light source is rectangular, and in that the analysis module comprises circuitry adapted, for each image captured by the sensor, for dividing said image into a plurality of rectangular bands, the edges of which are equidistant from the edges of the illuminated zone.

9. The validation device according to claim 6, wherein the light source is circular, and in that the analysis module comprises circuitry adapted, for each image captured by the sensor, for dividing said image into a plurality of concentric rings centered on the center of the illuminated zone.

* * * * *